July 31, 1962  H. BRETTHAUER ETAL  3,046,863
PHOTOGRAPHIC CAMERA
Filed Feb. 3, 1960

United States Patent Office 3,046,863
Patented July 31, 1962

3,046,863
PHOTOGRAPHIC CAMERA
Hermann Bretthauer, Klein-Stockheim, near Braunschweig, and Joachim Mädge, Braunschweig, Germany, assignors to Franke & Heidecke, Fabrik Photographischer Präzisions-Apparate, Braunschweig, Germany, a firm of Germany
Filed Feb. 3, 1960, Ser. No. 6,518
3 Claims. (Cl. 95—64)

This invention relates to a photographic camera of the twin lens reflex type, and more particularly to the scale means for indicating the setting of the shutter speed and the diaphragm aperture, with or without a related indication of exposure values.

An object of the invention is the provision of generally improved and more satisfactory scale means.

Another object is the provision of scale means so designed and constructed as to eliminate certain parts heretofore deemed necessary, and to simplify other parts, and to enable a very satisfactory and efficient scale mechanism to be provided in a simpler manner and at less expense than heretofore.

A further object is the provision of scale means so designed as to have a stepped-up or increased motion as compared with the motion of conventional scale means heretofore used, so that the scale may be expanded in the direction of its motion, to enable it to be read more easily.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
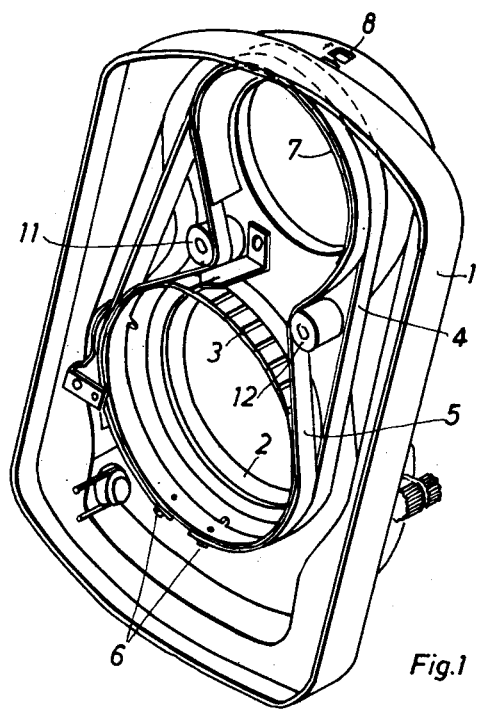
FIG. 1 is a perspective view of a camera lens and shutter housing, seen obliquely from the rear, showing one embodiment of the present invention applied thereto.

As is well known in the art, a twin lens reflex camera normally comprises a single camera body containing an upper or finder lens and a lower or picture taking lens, both with their optical axes arranged horizontally, and with an objective shutter and diaphragm mechanism associated with the picture taking lens. The exposure speed at which the shutter operates is controlled by a speed control ring which rotates about or approximately about the optical axis of the picture taking lens as a center of rotation, and the diaphragm aperture is controlled by a second ring which normally rotates about the same axis. Both of these rings are frequently arranged to be turned by gearing or other operating connections from some other operating member, and are not necessarily grasped directly by the fingers of the photographer.

The present invention is applicable to various kinds, styles, types, and makes of twin lens reflex cameras, but for the sake of giving a specific example, it will be assumed that the invention is to be applied to a twin lens reflex camera of the kind identified by the trademark "Rolleiflex," manufactured by the firm of Franke & Heidecke, of Braunschweig, Germany, and widely known and used throughout the United States. The disclosure of the present application presupposes that the reader is familiar with the main constructional features of the "Rolleiflex" camera, particularly with the heretofore used scale mechanism in the vicinity of the finder lens and picture taking lens. Those not already familiar with such construction may become acquainted with the same by studying Bretthauer and Albrecht Patent 2,912,913, and Weiss Patent 2,912,914, both issued November 17, 1959, and by referring to the publications mentioned in column 2 of each of said patents.

As will be seen from the patents and publications just mentioned, the shutter speed scale has heretofore been formed usually on a cylindrical flange or segment on a ring rotatable about or approximately about the optical axis of the finder lens, this ring being connected by gearing to the shutter speed control ring of the shutter, which rotates about the optical axis of the picture taking lens. Likewise the diaphragm aperture scale has usually been marked on a similar cylindrical flange or segment on another ring likewise rotatable about or approximately about the axis of the finder lens, and connected by gearing to the diaphragm aperture control ring rotatable about the axis of the picture taking lens. This gearing has involved substantial expense, and also has often been subject to backlash.

According to the present invention, the gearing is eliminated, and a simpler and less expensive construction is provided, by placing the scales on flexible tapes or strips which are connected to the respective control rings of the shutter unit, to be driven thereby, and which pass over the aperture of the finder lens so that the indications of these scales can be read in the accustomed manner by a person looking downwardly toward the top of the housing of the finder lens.

Figure 2:
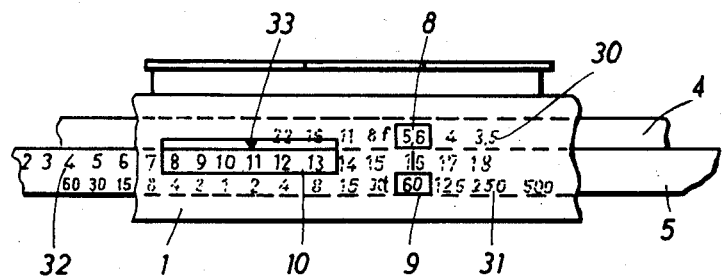
FIG. 2 is a top plan view of certain parts seen in FIG. 1, with some of the parts distorted to a different position for greater clarity.

Referring now to FIGS. 1 and 2, the housing which covers the front portion of the lens assembly (both finder lens and picture taking lens) is indicated in general at 1, the lenses themselves and the shutter mechanism usually being supported from the lens board which is not here shown.

Suitably mounted for rotation within this housing 1, about an axis corresponding exactly or approximately to the optical axis of the picture taking lens, are two rotary barrels or rings 2 and 3, which may directly represent respectively the diaphragm aperture control ring and the shutter speed control ring of the shutter assembly, or which, preferably, may be separate rings which engage with and are driven by the diaphragm aperture control ring and speed control ring, respectively, when the housing 1 is assembled in normal position on the rest of the camera.

A flexible tape or band 4 is connected to the ring 2 and extends upwardly therefrom as shown, passing over the top of the arcuate stationary member 7, the upper portion of which constitutes a cylindrical guide path concentric or approximately concentric with the optical axis of the finder lens. A second tape or band 5 is similarly connected to the other rotary ring 3 and likewise passes upwardly and over the stationary guide path 7, just to the rear of the tape or band 4. The ends of each tape may be fixed to suitable points on the periphery of its respective ring by any suitable means such as the screws 6.

The band 4 carries the diaphragm aperture scale 30, which is read through a suitable window opening 8 in the overlying part of the housing 1. The other band 5 carries the shutter speed scale 31 which is similarly read through a window opening 9 in the stationary part of the housing 1. In addition, the band 5 may carry, if desired, an exposure value scale 32, a considerable length of which can be seen at a time through the elongated window 10 in the stationary part of the housing 1, the exposure value scale being read by means of an index mark 33 which is marked on the band 4, the window 10 being wide enough to expose the mark 33 on the band 4 as well as the scale 32 on the band 5.

In the form shown in FIG. 1, the tape 4 goes directly from the diaphragm aperture ring 2 to the guide 7, while the other band 5 passes over idler guide rollers 11 and 12 on the way to the guide 7. The use of these idler rollers 11 and 12 enables the tape 5 to hug a greater portion of the periphery of the ring 3, as plainly seen in FIG. 1. This is advantageous in the case of the shutter speed ring 3, which ordinarily has a greater angular range of movement, from one extreme position to the other, than does the diaphragm aperture ring 2, and the use of the rollers 11 and 12 enables the tape to be operated through the desired greater range of travel of its ring. Of course the same arrangement can be used also for the tape 4 if the proportions of the parts are such that the ring 2 must move through a sufficiently great range to require this.

Figure 3:
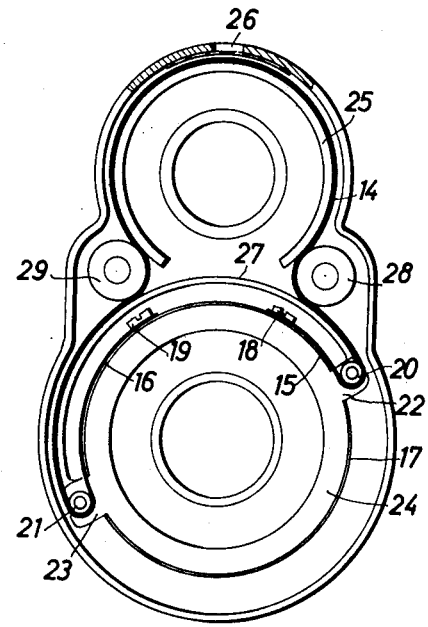
FIG. 3 is a front face view, somewhat diagrammatic, of a portion of a lens and shutter housing, illustrating a second embodiment of the invention.

A modified form of construction is shown in FIG. 3. Here, the tape 14 has one end 15 fastened to a stationary cylindrical guide member 17 by means of a screw 18, while the other end 16 of the tape is fastened to the same stationary cylindrical guide member 17 by the screw 19. This cylindrical guide member is concentric with the axis of rotation of the setting ring 24 which rotates about or approximately about the optical axis of the picture taking lens, and which carries radial arms 22 and 23 on which small rollers 20 and 21 are mounted. The rollers 20 and 21 are preferably 180 degrees apart.

The tape 14 passes from one stationary end (e.g., the end 15) around one of the small rollers, such as 20, and then goes around the outside of the stationary cylindrical guide 25 which is substantially concentric with the optical axis of the finder lens, so that the graduated scale on the tape may be read through the window 26 in the overlying stationary part of the housing 1. Then the tape continues on around the stationary guide 25, passes around the other small roller 21, and goes to its second fixed end 16.

In order to assure uniform guiding of the tape, a concentric cylindrical guide 27 is preferably secured to the ring 24 in the position shown, to provide an arcuate support for the tape regardless of the rotation of the ring 24. Moreover, between the guide 27 and the stationary guide 25, there are two guide rollers 28 and 29 rotatable about stationary axes, which hold the tape 14 always in hugging relation to the guides 25 and 27, as shown. With this arrangement, the tape always occupies the same path regardless of the rotary position to which the ring 24 may be adjusted, and thus the tape always has the same degree of tautness.

This arrangement serves to accelerate the movement of the tape to double the circumferential movement of the ring 24 and its rollers 20 and 21. In effect this expands the tape in a lengthwise direction, enabling the graduations to be twice as far apart as would be the case if the ends of the tape were attached to the ring 24 to move therewith. This, in turn, enables the graduation numerals to be marked in larger size, and thus to be more clear and legible.

This same arrangement may be used both for the tape which carries the diaphragm aperture scale and for the tape which carries the shutter speed scale. In other words, the shutter speed scale and the diaphragm aperture scale may be identical with each other (except for the graduations, of course) and the arrangement shown in FIG. 3 may represent either or both of these scale tapes.

Either the arrangement shown in FIGS. 1 and 2 or the arrangement shown in FIG. 3 may be applied equally well to tapes for other scales of a camera, but are here disclosed merely by way of example in connection with the diaphragm aperture scale and the shutter speed scale, which constitute the principal and preferred usefulness of this arrangement.

The tapes or bands 4, 5, and 14 may be of thin flexible strips of metal, or of other suitable flexible material having a high degree of dimensional stability, such as plastic material, tightly woven fabric, etc.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera of the twin lens reflex type having a picture taking lens axis and a finder lens axis located about and substantially parallel to the taking lens axis and having a housing part located above the finder axis and an observation window in such housing part, and having a ring rotatable substantially about the taking axis, the position of which ring is to be indicated at said observation window, and having a scale-bearing tape movable beneath said housing part in such position that a scale thereon may be seen through said observation window, said tape being operatively connected to said ring to be moved by rotation of said ring, characterized by the fact that said tape is driven directly by a part fastened to and moving with said ring, without intervening gears, and by the fact that said tape has two opposite ends, both of which are fastened to maintain said tape under a constant degree of tautness in all rotary positions of said ring, rotation of said ring in one direction serving to produce a pull on the portion of said tape near one end thereof and to release tension on the portion of said tape near the other end thereof, rotation of said ring in the opposite direction serving to produce a pull on the portion of said tape near said other end thereof and to release tension on the portion of said tape near said one end thereof, and further characterized by the fact that said ends of said tape are fastened to a stationary member, and that said ring carries two rollers mounted on and moving bodily with said ring during rotation of said ring, the portion of said tape near each end thereof passing over one of said rollers between the fastened end of the tape and the portion of said tape near said observation window, in such manner that rotation of said ring will cause multiplied movement of said tape to a greater extent than the extent of circumferential movement of said ring.

2. A photographic camera of the twin lens reflex type having a picture taking lens axis and a finder lens axis located above and substantially parallel to the taking lens axis and having a housing part located above the finder axis and an observation window in such housing part, and having a ring rotatable substantially about the taking axis, the position of which ring is to be indicated at said observation window, and having a scale-bearing tape movable beneath said housing part in such position that a scale thereon may be seen through said observation window, said tape being operatively connected to said ring to be moved by rotation of said ring, characterized by the fact that said ring has a substantially cylindrical surface portion turning with said ring and substantially concentric with the axis of rotation of said ring, and by the fact that staid tape has two opposite ends, both of which are fastened to maintain said tape under a constant degree of tautness in all rotary positions of said tape, and by the fact that said tape is placed in such position relative to said ring that the central portion of said tape moves past said observation window in underlying relation thereto and that portions of said tape near opposite ends thereof lie against and are supported by said cylindrical surface portion of said ring to variable circumferential extents depending upon the rotary position of said ring, and further characterized by the fact that said ends of said tape are fastened to a stationary member, and that said ring carries two rollers mounted on and moving bodily with said ring during rotation of said ring, the portion of said tape near each end thereof passing over one of said rollers between the fastened end of the tape and the portion of said tape near said observation window, in such manner that rotation of said ring will cause multiplied movement of said tape to a greater extent than the extent of circumferential movement of said ring.

3. A photographic camera of the twin lens reflex type having a picture taking lens axis and a finder lens axis located above and substantially parallel to the taking lens axis and having a housing part located above the finder axis and an observation window in such housing part, and having a ring rotatable substantially about the taking axis, the position of which ring is to be indicated at said observation window, and having a scale-bearing tape movable beneath said housing part in such position that a scale thereon may be seen through said observation window, said tape being operatively connected to said ring to be moved by rotation of said ring, characterized by the fact that said ring has a substantially cylindrical surface portion turning with said ring and substantially concentric with the axis of rotation of said ring, and by the fact that said tape has two opposite ends, both of which are fastened to maintain said tape under a constant degree of tautness in all rotary positions of said tape, and by the fact that said tape is placed in such position relative to said ring that the central portion of said tape moves past said observation window in underlying relation thereto and that portions of said tape near opposite ends thereof lie against and are supported by said cylindrical surface portion of said ring to variable circumferential extents depending upon the rotary position of said ring, and further characterized by the provision of at least one guide roller guiding said tape, between said observation window and said cylindrical surface portion, in a path increasing the extent of contact of said tape with said cylindrical surface portion in a circumferential direction, and further characterized by the fact that said ends of said tape are fastened to a stationary member, and that said ring carries two other rollers mounted on and moving bodily with said ring during rotation of said ring, the portion of said tape near each end thereof passing over one of said rollers between the fastened end of the tape and the portion of said tape near said observation window, in such manner that rotation of said ring will cause multiplied movement of said tape to a greater extent than the extent of circumferential movement of said ring.

References Cited in the file of this patent

UNITED STATES PATENTS

| | | |
|---|---|---|
| 2,527,106 | Smith | Oct. 24, 1950 |
| 2,859,675 | Kobayashi et al. | Nov. 11, 1958 |
| 2,926,584 | Gebele | Mar. 1, 1960 |

OTHER REFERENCES

Spieweck, German application Serial No. V10,149, printed July 12, 1956 (K157a–105).